(12) United States Patent
Abe et al.

(10) Patent No.: US 7,998,562 B2
(45) Date of Patent: Aug. 16, 2011

(54) PHOTOCATALYST SHEET AND METHOD OF PRODUCING SAME

(75) Inventors: Kazuhiro Abe, Osaka (JP); Hiroshi Toyoda, Osaka (JP); Takayuki Nakata, Osaka (JP); Eiichi Okamoto, Osaka (JP); Akira Fujishima, Kanagawa (JP); Kazuhito Hashimoto, Kanagawa (JP)

(73) Assignee: Taiyo Kogyo Corporation, Osaka-shi, Osaka (JP)

( * ) Notice: Subject to any disclaimer, the term of this patent is extended or adjusted under 35 U.S.C. 154(b) by 1074 days.

(21) Appl. No.: 10/565,121

(22) PCT Filed: Jul. 2, 2004

(86) PCT No.: PCT/JP2004/009772
§ 371 (c)(1),
(2), (4) Date: Jan. 19, 2006

(87) PCT Pub. No.: WO2005/007402
PCT Pub. Date: Jan. 27, 2005

(65) Prior Publication Data
US 2006/0234024 A1 Oct. 19, 2006

(30) Foreign Application Priority Data

Jul. 22, 2003 (JP) .................................. 2003-277912
Jul. 23, 2003 (JP) .................................. 2003-278672

(51) Int. Cl.
*B32B 27/08* (2006.01)
*B32B 27/18* (2006.01)
*B32B 17/10* (2006.01)
*B05D 1/36* (2006.01)
*B05D 3/02* (2006.01)

(52) U.S. Cl. ........ 428/212; 428/422; 428/426; 428/359; 428/421; 427/402; 502/350

(58) Field of Classification Search .................... 428/212
See application file for complete search history.

(56) References Cited

U.S. PATENT DOCUMENTS 5,616,532 A 4/1997 Heller et al.
(Continued)

FOREIGN PATENT DOCUMENTS

JP 2-206547 A 8/1990
(Continued)

OTHER PUBLICATIONS

Notification of Transmittal of Translation of the International Preliminary Report on Patentability (Form PCT/IB/338 and Form PCT/IPEA/409) of International Application No. PCT/JP/2004/009772.
(Continued)

*Primary Examiner* — Melvin C Mayes
*Assistant Examiner* — Yun Qian
(74) *Attorney, Agent, or Firm* — Westerman, Hattori, Daniels & Adrian, LLP

(57) ABSTRACT

The present invention provides a new photocatalyst sheet in which the substrates coated with fluorocarbon resin are readily weldable mutually, and also of the high antifouling and water-repellant property by coating the outermost surface of film/fabric structure with fluorocarbon resin containing a photocatalyst and a photocatalyst sheet comprises a substrate (2), a first fluorocarbon resin layer (3) coated on said substrate (2), a second fluorocarbon resin layer (4) coated on said first fluorocarbon resin layer (3), and a third fluorocarbon resin layer (5) containing photocatalyst coated on said second fluorocarbon resin layer (4). The melting point of the first fluorocarbon resin layer (3) may be higher than the melting points of the second and the third fluorocarbon resin layers (4), (5).

17 Claims, 16 Drawing Sheets

U.S. PATENT DOCUMENTS 6,211,112 B1 * 4/2001 Ishibashi ................ 502/159

FOREIGN PATENT DOCUMENTS

| JP | 4-76858 U | 7/1992 |
|----|-----------|--------|
| JP | 09-076395 | 3/1997 |
| JP | 9-207289 | 8/1997 |
| JP | 10-44346 | 2/1998 |
| JP | 11-047610 | 2/1999 |
| JP | 11-047612 | 2/1999 |
| JP | 2002-96434 | 4/2002 |
| JP | 2002-282703 | 10/2002 |
| JP | 2002-323484 | 11/2002 |

OTHER PUBLICATIONS

Japanese Office Action issued Jun. 2, 2009 in corresponding Japanese application 2003-278672.

* cited by examiner

FIG. 6

| FEP Dispersion (kg) | TiO$_2$ Dispersion (kg) | Water (kg) | Surface Active Agent (kg) | Total Mass (kg) | FEP:TiO$_2$ (Mass Ratio) |
|---|---|---|---|---|---|
| 21 | 62.8 | 94.4 | 1.8 | 180 | 40:60 |

FIG. 7

| FEP Dispersion (kg) | TiO₂ Dispersion (kg) | Water (kg) | Surface Active Agent (kg) | Total Mass (kg) | FEP:TiO₂ (Mass Ratio) |
|---|---|---|---|---|---|
| 42.3 | 54.4 | 81.5 | 1.8 | 180 | 60:40 |

FIG. 8

| FEP Dispersion (kg) | TiO$_2$ Dispersion (kg) | Water (kg) | Surface Active Agent (kg) | Total Mass (kg) | FEP:TiO$_2$ (Mass Ratio) |
|---|---|---|---|---|---|
| 58.9 | 48.6 | 70.7 | 1.8 | 180 | 70:30 |

FIG. 9

| FEP Dispersion (kg) | TiO$_2$ Dispersion (kg) | Water (kg) | Surface Active Agent (kg) | Total Mass (kg) | FEP:TiO$_2$ (Mass Ratio) |
|---|---|---|---|---|---|
| 80.9 | 39 | 58.3 | 1.8 | 180 | 80:20 |

FIG. 10

| FEP Dispersion (kg) | TiO₂ Dispersion (kg) | Water (kg) | Surface Active Agent (kg) | Total Mass (kg) | FEP:TiO₂ (Mass Ratio) |
|---|---|---|---|---|---|
| 117.6 | 25.2 | 35.4 | 1.8 | 180 | 90:10 |

FIG. 11

| FEP Dispersion (kg) | TiO$_2$ Dispersion (kg) | Water (kg) | Surface Active Agent (kg) | Total Mass (kg) | FEP:TiO$_2$ (Mass Ratio) |
|---|---|---|---|---|---|
| 14.6 | 65.7 | 97.9 | 1.8 | 180 | 30:70 |

FIG. 12

| FEP Dispersion (kg) | TiO$_2$ Dispersion (kg) | Water (kg) | Surface Active Agent (kg) | Total Mass (kg) | FEP:TiO$_2$ (Mass Ratio) |
|---|---|---|---|---|---|
| 8.8 | 67.5 | 101.9 | 1.8 | 180 | 20:80 |

FIG. 13

| FEP Dispersion (kg) | TiO₂ Dispersion (kg) | Water (kg) | Surface Active Agent (kg) | Total Mass (kg) | FEP:TiO₂ (Mass Ratio) |
|---|---|---|---|---|---|
| 4.1 | 70.2 | 103.9 | 1.8 | 180 | 10:90 |

FIG. 14

| Sample | FEP:TiO$_2$ (Mass Ratio) | Evaluation of Thermal Bondability | Evaluation of Antifouling |
|---|---|---|---|
| Example 1 | 40:60 | ○ | ○ |
| Example 2 | 60:40 | ○ | ○ |
| Example 3 | 70:30 | ○ | ○ |
| Example 4 | 80:20 | ○ | ○ |
| Example 5 | 90:10 | ○ | △ |
| Example 6 | 60:40 | ○ | ○ |
| Comparative Example 1 | 30:70 | × | △ |
| Comparative Example 2 | 20:80 | × | △ |
| Comparative Example 3 | 10:90 | × | △ |
| Comparative Example 4 | 100:0 | ○ | × |

FIG. 15

| Sample | FEP:TiO₂ (Mass Ratio) | Decomposition of Oleic Glyceride | | | Color Difference ΔE* | Measurement of Contact Angle with Water (degrees) | | Evaluation of Thermal Weldability | Evaluation of Antifouling | Overall Evaluation |
|---|---|---|---|---|---|---|---|---|---|---|
| | | Coated (mg) | Decomposed (mg) | Rate of Decomposition (mg/cm²·day) | | Right after Manufacture | After UV Irradiation | | | |
| Example 1 | 40:60 | 106 | 14 | 0.56 | 27.27 | 119.2 | 107.0 | ○ | ○ | ○ |
| Example 2 | 60:40 | 111 | 10 | 0.40 | 28.02 | 110.2 | 104.7 | ○ | ○ | ○ |
| Example 3 | 70:30 | 119 | 10 | 0.40 | 16.66 | 112.0 | 106.3 | ○ | ○ | ○ |
| Example 4 | 80:20 | 113 | 11 | 0.52 | 13.10 | 114.3 | 111.9 | ○ | ○ | ○ |
| Example 5 | 90:10 | 117 | 10 | 0.40 | 4.94 | 110.4 | 109.2 | ○ | △ | ○ |
| Example 6 | 60:40 | 111 | 10 | 0.40 | 28.02 | 110.2 | 104.7 | ○ | ○ | ○ |

FIG. 16

| Sample | FEP:TiO₂ (Mass Ratio) | Decomposition of Oleic Glyceride | | | Color Difference ΔE* | Measurement of Contact Angle with Water (degrees) | | Evaluation of Thermal Weldability | Evaluation of Antifouling | Overall Evaluation |
|---|---|---|---|---|---|---|---|---|---|---|
| | | Coated (mg) | Decomposed (mg) | Rate of Decomposition (mg/cm²·day) | | Right after Manufacture | After UV Irradiation | | | |
| Comparative Example 1 | 30:70 | 106 | 15 | 0.60 | 26.83 | 123.7 | 106.0 | × | △ | × |
| Comparative Example 2 | 20:80 | 117 | 12 | 0.48 | 26.00 | 120.8 | 105.4 | × | △ | × |
| Comparative Example 3 | 10:90 | 114 | 11 | 0.44 | 28.21 | 108.9 | 80.5 | × | △ | × |
| Comparative Example 4 | 100:0 | --- | --- | --- | --- | --- | --- | ○ | × | × |

PHOTOCATALYST SHEET AND METHOD OF PRODUCING SAME

TECHNICAL FIELD

This invention relates to a photocatalyst sheet, particularly relates to the outermost surface of a substrate of which is coated with a fluorocarbon resin containing a photocatalyst and a method of manufacturing the same.

BACKGROUND ART

As for a film/fabric structure such as baseball parks, domes for various events, football stadiums, tent storages, gymnasiums, markets, and so forth, the materials used for sunshades of stores, truck hoods, mulching sheets, and so forth, the water-proof cloths used for raincoats, bags, chairs, and so forth, the materials of fiber-reinforced resins for belt conveyers, timing belts, and so forth, they are coated with transparent or colorless transparent surface coatings in order to maintain transparency and antifouling property. Here in this document a substrate refers to the above mentioned sheet products themselves or the materials used for these sheet products, and also to those coated with the surface coatings or to those before coated.

As for the known technology, a surface coating on the substrate is formed for improvement of the stability or the antifouling property, and as these coatings the transparent or colorless transparent surface coatings have been used in order to preserve the color or transparency of substrates made of film/fabric or fibers. As for the said coated materials, the fiber cloths woven from glass fiber or the like coated with fluorocarbon resin layer are known. These coated materials are water-repellent (the contact angle with water is 115-125°), and have such merits as incombustible, high mechanical strength, light-weighted, and flexible. However, the materials coated with fluorocarbon resin layer have faults that tend to collect dirt from the atmosphere such as smoke and soot, dusts, or fine yellow sands from the continental desert.

The photocatalysts of the late technology are coated on the surface of various materials such as a glass substrate. When an ultraviolet light in the sunshine is irradiated on the photocatalyst, organic contaminants on the surface of the material are decomposed by the redox reaction of the photocatalyst and this function is utilized for materials that need the so-called antifouling property. A binder containing the photocatalyst is used to coat the photocatalyst on a glass substrate. For example, U.S. Pat. No. 5,616,532 (reference 1) discloses the composition in which non-oxidizable polymer materials as the binder and titanium oxide fine particles are mixed in the solvent. The reference 1 discloses that the non-oxidizable polymer is such as silicone resins as the binder, and porous alumina and silica, colloidal tin oxide, or their mixtures are used. According to the reference 1, this binder is suggested to be coatable on the surface of such materials by drying or cure (low temperature treatment) as plastics or fibers which would otherwise requires thermal treatment (sintering) for coating, but the method to coat fluorocarbon resin layer containing the photocatalyst on the fluorocarbon resin layer is not suggested.

As for the method to coat fluorocarbon resin layer containing the photocatalyst on the substrate, Japanese Patent Application, JP 09-207289 A (reference 2) and JP 10-44346 A (reference 3) disclose the repeated coating of the dispersion containing titanium oxide fine particles as photocatalyst on the PTFE, fluorocarbon resin, layer, drying, and baking, and thus forming the PTFE layer on the surface of which are exposed the titanium oxide fine particles as the photocatalyst.

JP 11-47610 A (reference 4) and JP 11-47612 A (reference 5) disclose the forming of the photocatalyst layer by coating and baking of the dispersion containing PTFE powder and photocatalyst fine particles on the PTFE layer which is the reinforcing or supporting layer of film/fabric structure.

There is the problem that when the hydrophilicity was realized by introducing such ceramic components as aluminum fluoride into fluorocarbon resin, the hydrophobicity was gradually regained, thereby sufficient antifouling property could not be attained. And solving this problem, JP 09-76395 A (reference 6) disclose the fluorocarbon resin material of the fluorocarbon resin containing the photocatalyst coated on the flat and smooth surface of aluminum alloy substrate and the method to make hydrophilic the surface of fluorocarbon resin material, and suggests that the hydrophilicity defined as the contact angle with water below 90° was obtained.

In case that the surface area of the film/fabric structure is large, it is constructed by assembling many substrates for the structure. In this case it is required to weld each substrate in order to prevent leakage of water and air into the film/fabric structure. In the existing technology of the substrate that is coated with fluorocarbon resin, the thermal welding between the substrates for film/fabric structure by the hot welding the fluorocarbon resin tape of the same material and which is broader than the overlapped part. However, in case of the substrate the surface of which is coated with fluorocarbon resin, mutual thermal welding of substrates is possible, but its surface tends to be readily contaminated, and its cleaning cost tends to be high in case of large scale film/fabric structure such as outdoor stadiums.

On the other hand, in case of the photocatalyst sheet in which fluorocarbon resin layer contains photocatalyst, thermal welding is difficult for the fluorocarbon resin layer containing such inorganics as titanium oxide as photocatalyst and it is difficult to thermally lap-weld the photocatalyst sheet with large area. Hence the photocatalyst sheets with good thermal weldability and good antifouling property at welded parts are not so far materialized.

Also as disclosed in said reference 6, since the method to make hydrophilic the surface of fluorocarbon resin material on the flat and smooth aluminum alloy substrate is by the function of the photocatalyst irradiated with ultraviolet light, there are such problems as making sufficiently hydrophilic the material surface requires many days, contaminant accretes during the time, thereby sufficient antifouling property can not be attained by cleaning effect by making hydrophilic the surface region which was hydrophobic (contact angle about 90°) before the ultraviolet light (hereinafter the abbreviated term UV to be appropriately used) irradiation.

DISCLOSURE OF THE INVENTION

The first purpose of the present invention is, considering the above mentioned problem, to offer a new photocatalyst sheet in which substrates coated with fluorocarbon resin are readily weldable mutually, and also of a high antifouling property by coating the outermost surface of film/fabric structure with fluorocarbon resin containing photocatalyst and the method of manufacturing the same.

The second purpose of the present invention is, with reference to the above-mentioned problems, to offer a new photocatalyst sheet in which the uppermost surface of a substrate is coated with fluorocarbon resin layer containing a photocatalyst, said uppermost surface has water repellancy, and which has a high antifouling property when UV is irradiated on said uppermost surface, and the method of manufacturing the same.

In order to achieve the above mentioned first and second purposes, the first embodiment of the present invention is characterized in that the structure of a photocatalyst sheet of the present invention comprises: a substrate made of glass fiber; a first fluorocarbon resin layer made of PTFE coated on said substrate; a second fluorocarbon resin layer made of either one of PTFE, FEP, or PFA coated on said first fluorocarbon resin layer; and a third fluorocarbon resin layer made of FEP containing photocatalysts consisting at least of titanium oxide ($TiO_2$, $TiO_3$) coated on said second fluorocarbon resin layer, of which said photocatalysts have the part exposed on said third fluorocarbon resin layer, and the ratio of said photocatalysts in said third fluorocarbon resin layer is 10-60 weight %, and the surface of the fluorocarbon resin layer containing said photocatalysts of said photocatalyst sheet has water repellency upon ultraviolet light irradiation, and when photocatalyst sheets are thermally welded to each other, and if the welded part is peeled off at the rate of 20 mm/min, then whole of the fluorocarbon resin layer is completely peeled off from the substrate.

In the embodiment described above, the surface state of the substrate made of glass fiber is preferably either smooth, rough, or mesh-like. The second fluorocarbon resin layer may contain photocatalysts.

Preferably, the photoxidation ability of the surface of the fluorocarbon resin layer containing photocatalysts of a photocatalyst sheet is such that, when oleic glyceride is coated on said surface of a fluorocarbon resin layer, and ultraviolet light is irradiated onto said surface by 1 mW/cm$^2$, the rate of decomposition of said oleic glyceride is 0.1 mg/cm$^2$ day or more.

Preferably, the photoreduction ability of the surface of the fluorocarbon resin layer containing photocatalysts of a photocatalyst sheet is such that, when said photocatalyst sheet is soaked in the 0.1N (normal) silver nitrate aqueous solution, and ultraviolet light is irradiated for one minute onto the surface of said fluorocarbon resin layer containing said photocatalysts by 1 mW/cm$^2$, the color difference change is $\Delta E^* \geq 1$.

The contact angle of the surface of the fluorocarbon resin layer cotaining photocatalysts is preferably about 90 degrees or more. The thickness of the fluorocarbon resin layer cotaining photocatalysts is preferably 1 μm or more.

By the embodiment described above since the melting point of FEP of the outer most layer containing the photocatalyst is lower than that of PTFE of the first fluorocarbon resin layer on the substrate made of glass fiber, the thermal welding between photocatalyst sheets is readily achieved, and the surface of the fluorocarbon resin layer containing photocatalysts contained in the uppermost layer of the photocatalyst sheet has water repellency upon ultraviolet light irradiation, and high antifouling property is given by the redox reaction when the photocatalysts exposed on the surface of the third fluorocarbon resin of the photocatalyst sheet are irradiated with the ultraviolet light involved in the sunshine.

The embodiment of the present invention is characterized by the higher melting point of the first fluorocarbon resin layer than those of the second and the third fluorocarbon resin layer, and the melting point of the second fluorocarbon resin layer higher than, or as high as, that of the third fluorocarbon resin layer. The second and the third fluorocarbon resin layers may be made of the identical resin.

The present invention is also characterized by the higher melting point of the first fluorocarbon resin layer than those of the second and the third fluorocarbon resin layers, and the melting point of the first fluorocarbon resin layer higher than, or as high as, that of the second fluorocarbon resin layer. The first and the second fluorocarbon resin layers may be made of the identical resin. The first and the third fluorocarbon resin layers may be made of the identical resin.

In order to achieve the above mentioned first purpose, the second embodiment of the present invention is characterized in that the structure of a photocatalyst sheet of the present invention comprises: a substrate; a first fluorocarbon resin layer coated on the substrate; a second fluorocarbon resin layer coated on the first fluorocarbon resin layer; and a third fluorocarbon resin layer containing photocatalysts consisting at least of titanium oxide ($TiO_2$, $TiO_3$) coated on the second fluorocarbon resin layer, of which the third fluorocarbon resin layer has lower melting point than the first fluorocarbon resin layer, the photocatalysts have the part exposed on the third fluorocarbon resin layer, and the ratio of the photocatalysts in the third fluorocarbon resin layer is 10-60 weight %, and the third fluorocarbon resin layer is thermally weldable, and when photocatalyst sheets are thermally welded to each other, and if the welded part is peeled off at the rate of 20 mm/min, then whole of the fluorocarbon resin layer is completely peeled off from the substrate.

In order to achieve the above mentioned second purpose, the third embodiment of the present invention is such that the structure of a photocatalyst sheet of the present invention comprises: a substrate; a first fluorocarbon resin layer coated on the substrate; a second fluorocarbon resin layer coated on the first fluorocarbon resin layer; and a third fluorocarbon resin layer containing photocatalysts consisting at least of titanium oxide ($TiO_2$, $TiO_3$) coated on the second fluorocarbon resin layer, of which the third fluorocarbon resin layer has lower melting point than the first fluorocarbon resin layer, the photocatalysts have the part exposed on the third fluorocarbon resin layer, and the ratio of the photocatalysts in the third fluorocarbon resin layer is 10-60 weight %, the surface of the fluorocarbon resin layer containing photocatalysts of the photocatalyst sheet is water repellent upon ultraviolet light irradiation, and the third fluorocarbon resin layer is thermally weldable, and when photocatalyst sheets are thermally welded to each other, and if the welded part is peeled off at the rate of 20 mm/min, then whole of the fluorocarbon resin layer is completely peeled off from the substrate.

In the embodiment described above, the substrate is preferably made of glass fiber, and its surface state is either smooth, rough, or mesh-like. The first fluorocarbon resin layer is made of PTFE, the second fluorocarbon resin layer is made of either one of PTFE, FEP, or PFA, and the third fluorocarbon resin layer is made of FEP.

Preferably, the melting point of the second fluorocarbon resin layer may be as high as, or higher than, that of the third fluorocarbon resin layer. In this case, the second and the third fluorocarbon resin layers may be made of identical fluorocarbon resin.

Preferably, the melting point of the first fluorocarbon resin layer may be as high as, or higher than, that of the second fluorocarbon resin layer. In this case, the first and the second fluorocarbon resin layers may be made of identical fluorocarbon resin. Also, the second fluorocarbon resin layer may contain photocatalysts.

In order to achieve the above mentioned second purpose, the fourth embodiment of the present invention is characterized in that a photocatalyst sheet of the present invention has a substrate which is coated with fluorocarbon resin layers, at least its uppermost layer is coated with the fluorocarbon resin layer containing photocatalysts, and the surface of the fluorocarbon resin layer containing photocatalysts is water repellent upon ultraviolet light irradiation, and when photocatalyst sheets are thermally welded to each other, and if the welded part is peeled off at the rate of 20 mm/min, then whole of the fluorocarbon resin layer is completely peeled off from the substrate.

By each of the embodiments described above, the combination of the first to the third fluorocarbon resin layers, which gives excellent thermal weldability between photocatalyst sheets, can be readily obtained. Especially when a substrate is glass fiber, the first fluorocarbon resin layer is PTFE, the second fluorocarbon resin layer is either one of PTFE, FEP, or PFA, and the third fluorocarbon resin layer is FEP, since FEP as the uppermost fluorocarbon resin layer containing photocatalysts has lower melting point than PTFE as the first fluorocarbon resin layer on the substrate side, photocatalyst sheets can be easily thermally welded to each other. Also, high antifouling property is given by the redox reaction when the photocatalysts exposed on the surface of said third fluorocarbon resin are irradiated with the ultraviolet light involved in the sunbeam. Further, the surface of the fluorocarbon resin layer containing photocatalysts of the uppermost layer of a photocatalyst sheet can be given water repellency upon ultraviolet light irradiation.

Preferably, the photoxidation ability of the surface of said fluorocarbon resin layer containing the photocatalyst is such that, when oleic glyceride is coated on said surface of fluorocarbon resin layer, and an ultraviolet light is irradiated onto said surface by 1 mW/cm$^2$, the rate of decomposition of said oleic glyceride is 0.1 mg/cm$^2$ day or more.

The photoreduction ability of the surface of said fluorocarbon resin layer containing the photocatalyst is such that, when said photocatalyst sheet is soaked in the 0.1N (normal) silver nitrate aqueous solution, and an ultraviolet light is irradiated for one minute onto the surface of said fluorocarbon resin layer containing the photocatalyst by 1 mW/cm$^2$, the color difference change is preferably $\Delta E^* \geq 1$.

The contact angle of the surface of fluorocarbon resin layer cotaining photocatalyst is preferably about 90 degrees or more.

According to the above-mentioned embodiment, when the UV light contained in the sunshine or the fluorescent light having the energy higher than the forbidden gap of the photocatalyst is irradiated onto said photocatalyst, the high antifouling property is attained by the decomposition of the organics accreted on the photocatalyst sheet surface by the redox reaction of the photocatalyst. The contact angle with water of the uppermost fluorocarbon resin layer surface of the photocatalyst sheet of the present invention can be made about 90° or more as an index of water-repellent property.

In the embodiment described above, the thickness of fluorocarbon resin layer containing the photocatalyst is 1 μm or more. In this case since said substrate is made of fiber, and its surface has proper surface roughness, the surface area of the photocatalyst can be made larger per unit area compared with the flat and smooth surface, thereby the high antifouling property can be attained. Consequently, when the contaminant is accreted on fluorocarbon resin layer containing the photocatalyst, a high antifouling property can be attained by the redox function of the photocatalyst located in the three dimensional orientation around it owing to surface roughness. Mutual thermal weldability of the photocatalyst sheets can also be made better.

A manufacturing method of a photocatalyst sheet of the present invention is that of a photocatalyst sheet, which comprises: a substrate made of glass fiber; a first fluorocarbon resin layer made of PTFE coated on the substrate; a second fluorocarbon resin layer made of either one of PTFE, FEP, or PFA coated on the first fluorocarbon resin layer; and a third fluorocarbon resin layer made of FEP containing photocatalysts consisting at least of titanium oxide ($TiO_2$, $TiO_3$) coated on the second fluorocarbon resin layer, of which the photocatalysts have the part exposed on the third fluorocarbon resin layer, the ratio of the photocatalysts in the third fluorocarbon resin layer is 10-60 weight %, and the surface of the fluorocarbon resin layer containing the photocatalysts of the photocatalyst sheet is water repellent upon ultraviolet light irradiation, and when photocatalyst sheets are thermally welded to each other, and if the welded part is peeled off at the rate of 20 mm/min, then whole of the fluorocarbon resin layer is completely peeled off from the substrate, and said method is characterized to comprise a process of coating the first fluorocarbon resin layer on the substrate, a process of coating the second fluorocarbon resin layer on the first fluorocarbon resin layer, and a process of coating the third fluorocarbon resin layer containing photocatalysts on the second fluorocarbon resin layer.

Another manufacturing method of a photocatalyst sheet of the present invention is that of a photocatalyst sheet, which is characterized to comprise: a substrate made of glass fiber; a first fluorocarbon resin layer made of PTFE coated on the substrate; a second fluorocarbon resin layer made of either one of PTFE, FEP, or PFA coated on the first fluorocarbon resin layer; and a third fluorocarbon resin layer made of FEP containing photocatalysts consisting at least of titanium oxide ($TiO_2$, $TiO_3$) coated on the second fluorocarbon resin layer, of which the photocatalysts have the part exposed on the third fluorocarbon resin layer, the ratio of the photocatalysts in the third fluorocarbon resin layer is 10-60 weight %, and the surface of the fluorocarbon resin layer containing said photocatalysts of the photocatalyst sheet is water repellent upon ultraviolet light irradiation, and when photocatalyst sheets are thermally welded to each other, and if the welded part is peeled off at the rate of 20 mm/min, then whole of the fluorocarbon resin layer is completely peeled off from the substrate, and said method is characterized to comprise a process of coating the first fluorocarbon resin layer on the substrate, a process of coating the second fluorocarbon resin layer containing photocatalysts on the first fluorocarbon resin layer, and a process of coating the third fluorocarbon resin layer containing photocatalysts on the second fluorocarbon resin layer.

By said method of manufacturing, coating the third fluorocarbon resin layer containing photocatalysts on the uppermost surface of the substrate makes thermal welding easy, and the photocatalysts exposed on the third fluorocarbon resin layer have water repellency upon ultraviolet light irradiation, thereby a photocatalyst sheet having antifouling property can be manufactured at low cost.

Further, in case that the second fluorocarbon resin layer contains photocatalysts, since both the second and the third fluorocarbon resin layers contain photocatalysts, a photocatalyst sheet having excellent thermal weldability and antifouling property can be manufactured.

As for the embodiment described above, the coating process of the first fluorocarbon resin layer, the second fluorocarbon resin layer either containing or not containing the photocatalyst, and the third fluorocarbon resin layer containing the photocatalyst is preferably conducted continuously. By this embodiment the photocatalyst sheet comprising the first to the third fluorocarbon resin layer continuously coated on the substrate and the third fluorocarbon resin layer containing the photocatalyst on the outermost surface may be efficiently manufactured.

As for the embodiment described above, the third fluorocarbon resin layer containing the photocatalyst may be coated on the substrate that has been coated beforehand with the first and the second fluorocarbon resin layers. By this embodiment, the manufacture of the photocatalyst sheet may be possible by first preparing the substrate coated with the first and the second fluorocarbon resin layers beforehand and by coating the third fluorocarbon resin layer containing the photocatalyst anytime later.

The coating process of the third fluorocarbon resin layer containing the photocatalyst characteristically comprises: a coating process of the dispersion for fluorocarbon resin containing the titanium oxide fine particles as the photocatalyst on the second fluorocarbon resin layer; a drying process; a sintering process at the temperature higher than the melting point of the resin for the third fluorocarbon resin layer; and a process to make the photocatalyst exposed on the surface of the third fluorocarbon resin layer. By this embodiment, the third fluorocarbon resin layer containing the photocatalyst may be sintered on the first and the second fluorocarbon resin layers on substrate and the photocatalyst sheet with excellent thermal bondability and the antifouling property may be manufactured.

A method of manufacture of the photocatalyst sheet of the present invention includes: a process to coat an uppermost layer of a substrate with a fluorocarbon resin layer containing a photocatalyst; and characterized in that the surface of said fluorocarbon resin layer containing the photocatalyst is water-repellant. According to the manufacturing method mentioned above, since the uppermost surface of substrate is coated with the fluorocarbon resin layer containing the photocatalyst, the photocatalyst sheet can be provided at low cost. Its uppermost layer is water-repellant and the high antifouling property, and can be easily thermally welded.

BRIEF DESCRIPTION OF THE DRAWINGS

FIG. 6 is the table of the composition of a dispersion used to manufacture the third fluorocarbon resin layer containing the photocatalyst of Example 1.

FIG. 7 is the table of the composition of a dispersion used to manufacture the third fluorocarbon resin layer containing the photocatalyst of Example 2.

FIG. 8 is the table of the composition of a dispersion used to manufacture the third fluorocarbon resin layer containing the photocatalyst of Example 3.

FIG. 9 is the table of the composition of a dispersion used to manufacture the third fluorocarbon resin layer containing the photocatalyst of Example 4.

FIG. 10 is the table of the composition of a dispersion used to manufacture the third fluorocarbon resin layer containing the photocatalyst of Example 5.

FIG. 11 is the table of the composition of a dispersion used to manufacture the third fluorocarbon resin layer containing the photocatalyst of Comparative Example 1.

FIG. 12 is the table of the composition of dispersion used to manufacture the third fluorocarbon resin layer containing the photocatalyst of Comparative Example 2.

FIG. 13 is the table of the composition of dispersion used to manufacture the third fluorocarbon resin layer containing the photocatalyst of Comparative Example 3.

FIG. 14 is the table of the evaluation results of the thermal weldability and the fouling property by outdoor exposure of Examples and Comparative Examples.

FIG. 15 is the table which shows the evaluation results of the photocatalytic function, the contact angle, thermal weldability, and antifouling property by the outdoor exposure of the uppermost layer containing the photocatalyst of Examples.

FIG. 16 is the table which shows the evaluation results of the photocatalytic function, the contact angle, thermal weldability, and antifouling property by the outdoor exposure of the uppermost layer containing the photocatalyst of Comparative Examples.

BEST MODES FOR CARRYING OUT THE INVENTION

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof.

The embodiment of the present invention is illustrated in details referring to figures.

Figure 1:
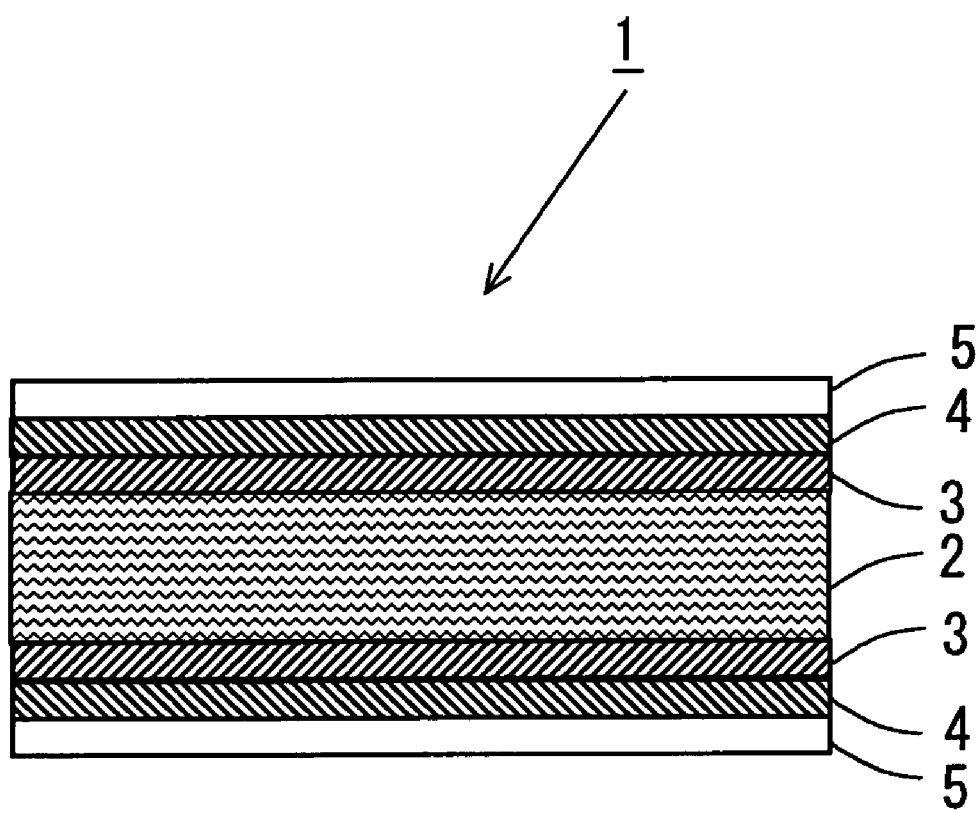
FIG. 1 is a schematic cross-sectional view illustrating the structure of a photocatalyst sheet according to the present invention as one form of embodiment thereof.
Figure 2:
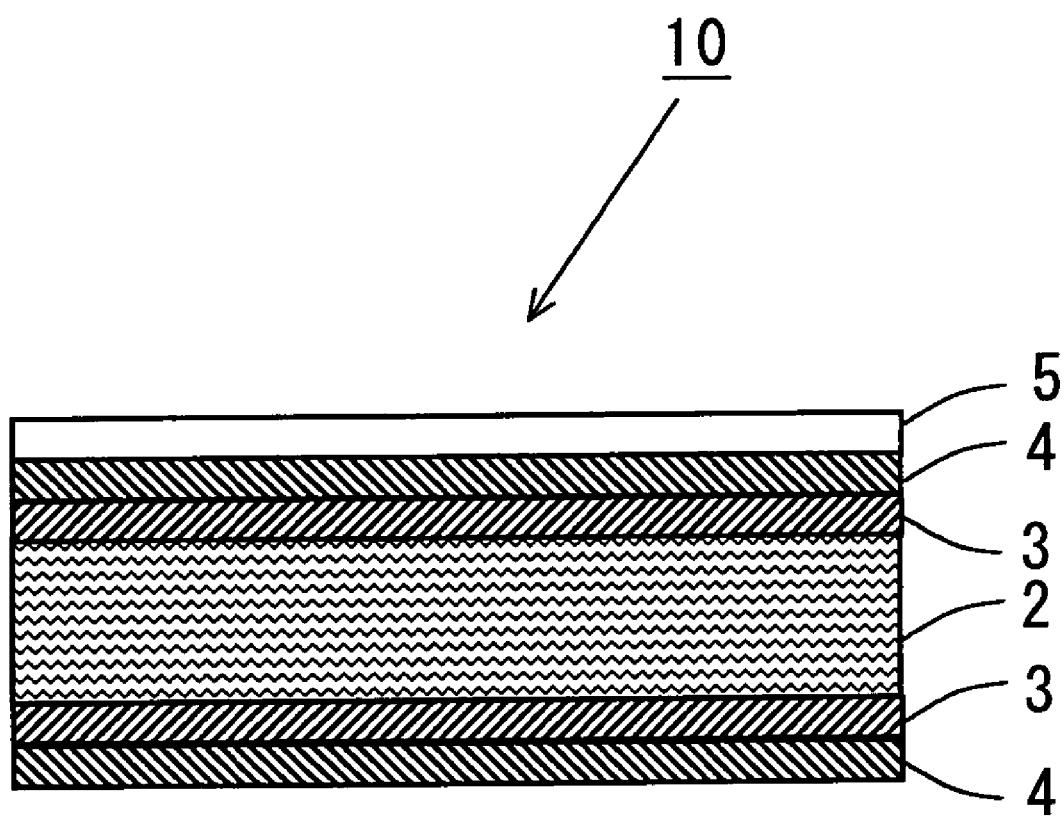
FIG. 2 is another schematic cross-sectional view illustrating the structure of a photocatalyst sheet according to the present invention.

The structures of a photocatalyst sheet are illustrated in FIGS. 1-4. FIG. 1 and 2 are cross-sectional views showing the structure of a photocatalyst sheet of this invention. As is seen in figures, the photocatalyst sheet 1 has the structure of lamination, a first fluorocarbon resin layer 3, a second fluorocarbon resin layer 4, and a third fluorocarbon resin layer containing a photocatalyst 5 on both sides of substrate 2 made of a glass fiber, fiber-reinforced resin, and the like.

FIG. 1 shows, as an example, a structure of lamination of fluorocarbon resin layer 3, 4, 5 coated on both surfaces of the substrate 2, but a photocatalyst sheet of the present invention 10 may be modified according to the purpose of its use, as shown in FIG. 2, so that the third fluorocarbon resin layer containing the photocatalyst 5 may be coated on only one side or the designated region of the surface of substrate 2.

The substrate 2 is either the woven textile or non-woven cloth made of such fibers as glass fiber, carbon fiber, polyamide fiber, polyimide fiber, PBO fiber, silica fiber, Basalt fiber, polyester fiber, nylon fiber, cotton, hemp, kenaf, and the like. The surface of the substrate 2 may be either smooth, rough, or mesh-like state.

Here, the surface of the substrate 2 may be, as mentioned below, either non-flat concave and convex plane or mesh-like with surface roughness (Ra) being rough in order to improve the antifouling property. The surface roughness may be several times that of flat and smooth substrate of aluminum or glass, about 1.4-2.7 $\mu m$. It may be, for example, 10 $\mu m$ or more.

As for the above described first to the third fluorocarbon resin layers 3, 4, and 5, the melting point of the first fluorocarbon resin layer 3 may be higher than those of the second fluorocarbon resin layer 4 and the third fluorocarbon resin layer 5, and the melting point of the second fluorocarbon resin layer 4 may be higher than, or as high as, that of the third fluorocarbon resin layer 5. In case that the melting points are same, the second fluorocarbon resin layer 4 and the third fluorocarbon resin layer 5 may be made of the identical fluorocarbon resin.

Further, the melting point of the first fluorocarbon resin layer 3 may be higher than those of the second fluorocarbon resin layer 4 and the third fluorocarbon resin layer 5, and the melting point of the first fluorocarbon resin layer 3 may be higher than, or as high as, that of the second fluorocarbon resin layer 4. In case that the melting points are same, the first fluorocarbon resin layer 3 and the second fluorocarbon resin layer 4 may be made of the identical fluorocarbon resin.

Furthermore, the first fluorocarbon resin layer 3 and the third fluorocarbon resin layer 5 may be made of the identical fluorocarbon resin. Not limited in this example, the mutual thermal weldability of the photocatalyst sheets can be improved by properly selecting the fluorocarbon material of the first to the third fluorocarbon resin layers 3, 4, 5. In this way, the combination of the first to the third fluorocarbon resin layers with good mutual thermal weldability of the photocatalyst sheets can be readily obtained.

As for the above described first to the third fluorocarbon resin layers 3, 4, and 5, the melting point of the third fluorocarbon resin layer 5 may be higher than those of the first fluorocarbon resin layer 3 and the second layer fluorocarbon resin 4, and the melting point of the second fluorocarbon resin layer 4 may be higher than, or as high as, that of the first fluorocarbon resin layer 3. In case that the melting points are same, the first fluorocarbon resin layer 3 and the second fluorocarbon resin layer 4 may be made of the identical fluorocarbon resin.

The melting point of the third fluorocarbon resin layer 5 may be higher than those of the first fluorocarbon resin layer 3 and the second fluorocarbon resin layer 4, and the melting point of the third fluorocarbon resin layer 5 may be higher than, or as high as, that of the second fluorocarbon resin layer 4. When the melting points are same, the third fluorocarbon resin layer 5 and the second fluorocarbon resin layer 4 may be made of the identical fluorocarbon resin.

By these conditions the combination of the first to the third fluorocarbon resin layers with excellent mutual thermal bondability of the photocatalyst sheet may be readily obtained.

The fluorocarbon resin may be the polymer or the copolymer of fluorine-containing monomers such as polytetrafluoroethylene (PTFE, melting point MP 327° C.), polyvinylidene fluoride (PVDF, MP 156-178° C.), copolymer of tetrafluoroethylene-perfluoroalkylvinylether (PFA, MP 310° C.), and copolymer of tetrafluoroethylene-hexafluoropropylene (FEP, MP 275° C.). The melting points of the materials here can be referred to "Fluorocarbon Resin Handbook", 7th Edition, edited by Industrial Association of Fluorocarbon Resin of Japan, June 1998, p. 18.

The photocatalyst sheet 1 of the present invention may be made of such materials, as an example, that the substrate 2 is glass fiber, the first fluorocarbon resin layer 3 is PTFE (MP T1=327° C.), the second fluorocarbon resin layer 4 is FEP (MP T2=275° C.), or PFA (T2=310° C.), and the third fluorocarbon resin layer 5 containing the photocatalyst is FEP (MP T3=275° C.).

Figure 3:
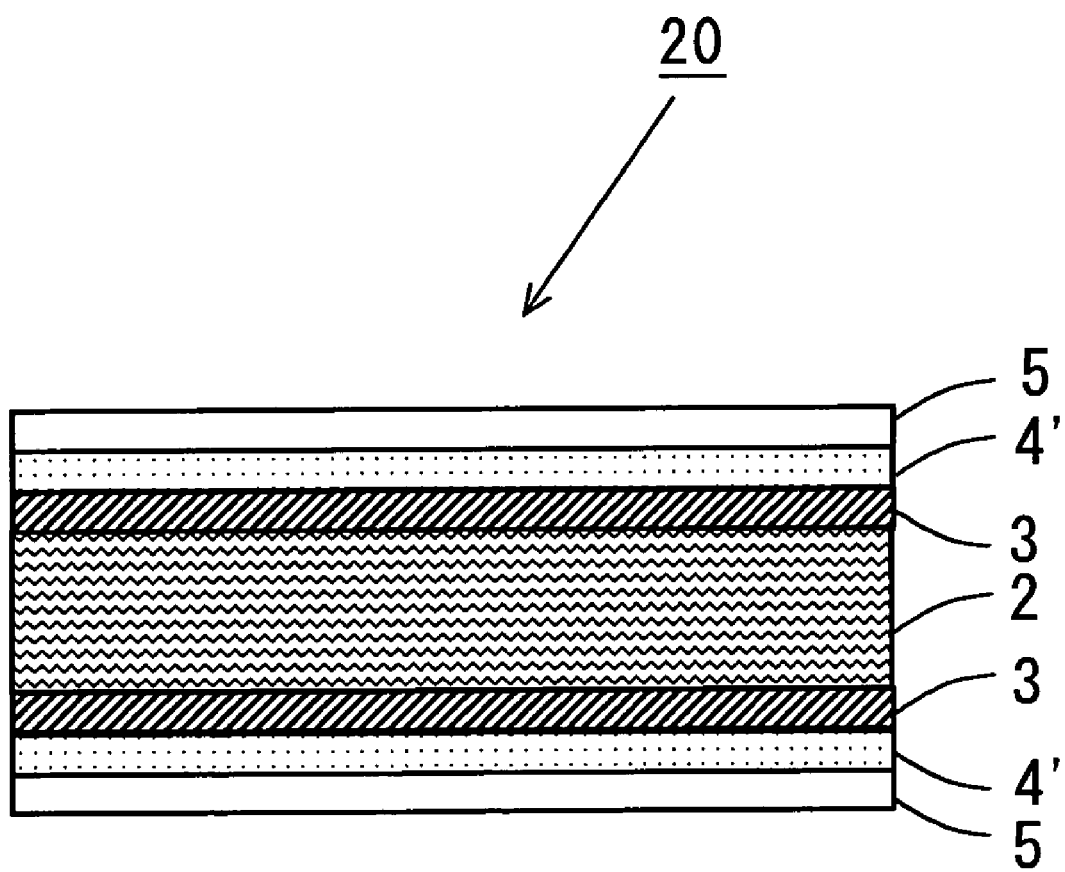
FIG. 3 is a cross-sectional view showing the other structure of a photocatalyst sheet of the present invention.

FIG. 3 is a cross-sectional view showing the other structure of a photocatalyst sheet 20 of this invention. As is seen in the figure the difference of the photocatalyst sheet 20 of this invention from the photocatalyst sheet 10 mentioned above is that a photocatalyst is contained also in a second fluorocarbon resin layer 4'. This second fluorocarbon resin layer 4' may be identical with the first fluorocarbon resin layer, or its melting point may be lower than that of the first fluorocarbon resin layer. The melting point (T3) of the third fluorocarbon resin layer 5 containing the photocatalyst may be lower, or as high as, that of the second fluorocarbon resin layer 4' containing the photocatalyst, that is, the combination of fluorocarbon resin layers may be that with T3≦T2. The explanation is omitted here for other combinations for it is same as that of the photocatalyst sheet 10.

The photocatalyst sheet 20 of this invention may be made of such materials, as an example, that the substrate 2 is glass fiber, the first fluorocarbon resin layer 3 is PTFE (MP T1=327° C.), the second fluorocarbon resin layer 4' containing the photocatalyst is selected from fluorocarbon resin such as either PTFE (MP T2=327° C.), FEP((MP T2=275° C.) or PFA (T2=310° C.), and the third fluorocarbon resin layer 5 containing the photocatalyst is FEP (MP T3=275° C.).

By this combination the antifouling property can be long maintained without deterioration by the action of the photocatalyst at the thermally welded part, as will be explained later, in case of thermal welding (may also be termed as thermal bonding) by sintering of the photocatalyst sheets, since the second fluorocarbon resin layer 4' also contains photocatalyst.

Figure 4:
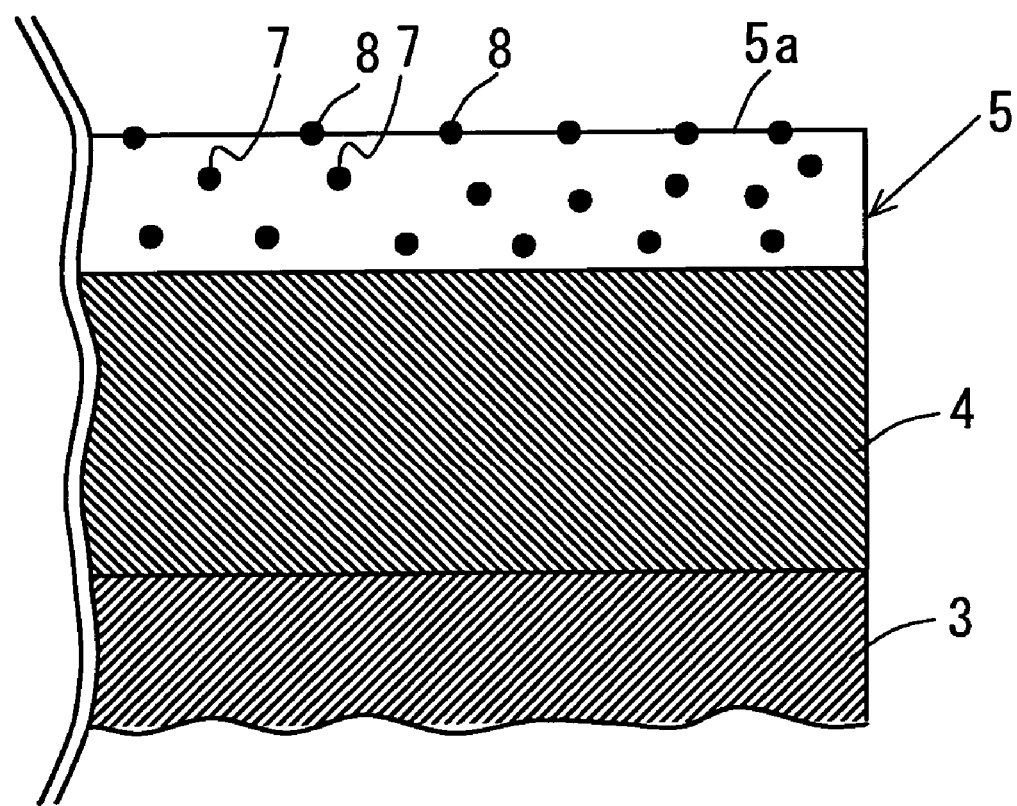
FIG. 4 is an enlarged cross-sectional view showing the structure of the substrate surface coated with the third fluorocarbon resin layer containing the photocatalyst of the present invention.

FIG. 4 is an enlarged cross-sectional view showing the structure of the substrate surface coated with the third fluorocarbon resin layer containing the photocatalyst of this invention. The third fluorocarbon resin layer 5 is made of, for example, FEP or the like, and the photocatalyst 7,8 is added to it. The photocatalyst 7,8 is the fine particles of, for example, the anatase type $TiO_2$ (titanium dioxide) with the diameter 1 nm-100 nm, and each shows the photocatalyst fine particles contained in the third fluorocarbon resin layer 5 and those exposed on its surface 5a. The diameters of the photocatalysts 7,8 may desirably be small in order to enlarge the surface area of the photocatalyst 8 exposed on the surface 5a, if the enhancement of photocatalytic effect is to be desired.

Here the photocatalysts 7,8 are the materials also called photo semiconductors. The photocatalysts 7,8 may be, in addition to the anatase type $TiO_2$ (band gap 3.2 eV, wavelength 388 nm), the rutile type $TiO_2$ (band gap 3.0 eV, wavelength 414 nm), titanium trioxide ($TiO_3$), etc. These oxidized titaniums are called titanium oxide as a general name. Photocatalysts may be, in addition to titanium oxide, zinc oxide (ZnO, band gap 3.2 eV, wavelength 388 nm), strontium titanate ($SrTiO_2$, band gap 3.2 eV, wavelength 388 nm), or tungsten trioxide ($WO_3$, band gap 3.2 eV, wavelength 388 nm).

The composition ratio of the above mentioned photocatalyst contained in the third fluorocarbon resin layer may be arbitrary, and may be determined by the purpose of application, quality, and the coating method. In case that photocatalyst sheets 1, 10, and 20 are mutually thermally welded (may also be called thermal bonding from now on), the content of the photocatalyst in fluorocarbon resin 5 may preferably be 10-60% by weight in order not to lower the welding strength of the thermally welded part. The surface of the photocatalyst sheets 1, 10, 20 can be hydrophobic or hydrophilic by adjusting the content of the photocatalyst in the third fluorocarbon resin layer 5 containing the photocatalyst.

As the photoxidation ability of the surface of the fluorocarbon resin layer containing the photocatalyst 5, when oleic glyceride is coated on the surface of fluorocarbon resin layer, and an ultraviolet light is irradiated onto said surface by 1 $mW/cm^2$, the rate of decomposition of oleic glyceride is preferably 0.1 $mg/cm^2$day or more. As the photoreduction ability of the surface of the fluorocarbon resin layer containing the photocatalyst 5, when said photocatalyst sheet is soaked in the 0.1N (normal) silver nitrate aqueous solution, and the UV light is irradiated for one minute onto the surface of said fluorocarbon resin layer containing the photocatalyst by 1 mW/cm$^2$, the color difference change is preferably $\Delta E^* \geqq 1$.

The surface of the photocatalyst sheet of the present invention is water-repellant, regardless of whether the UV irradiated or not. In this case, the water-repellant property may be defined as about 90° or more as the contact angle with water of the surface of fluorocarbon resin layer containing the photocatalyst 5.

Here, the definition of water repellency is 90° or more as the contact angle with water, the hydrophobicity is 60°-90°, and the hydrophilicity is 30° or less. Here refer to "The Mechanism of the Photocatalyst", written by Akira Fujishima, Kazuhito Hashimoto, and Toshiya Watanabe, 3rd edition, Nippon Jitsugyo Shuppansha, Mar. 20, 2001, p. 96-97 for the definition of the contact angle.

When the photocatalyst sheets 1, 10, 20 is used as the architectural film/fabric structure and are thermally welded mutually, the thermal weldability of the photocatalysts sheets 1, 10, and 20 can be improved by making the thickness of fluorocarbon resin layer containing the photocatalyst 5 as the uppermost layer to be 1 μm or more. The thickness of 1 μm or less of the third fluorocarbon resin layer containing the photocatalyst 5 is not preferred, for, though the antifouling property is maintained, photocatalyst sheets tend to cause peeling off or crack by friction or abrasion upon mutual thermal welding. When the thermal welding is not necessary between the photocatalysts sheets, the thickness of less than 1 μm of the third fluorocarbon resin layer containing the photocatalyst 5 may be selected.

An electric conductivity and a photocatalytic effect can be enhanced by adding metallic materials or photocatalytic function improvers to the third fluorocarbon resin layer 5 containing the above described photocatalysts. As the metallic materials Ag, Al, Au, Cu, Fe, In, Ir, Ni, Os, Pd, Pt, Rh, Ru, Sb, Sn, Zn, and Zr may be used.

The photocatalyst sheet of the present invention is comprised as described above, and the high antifouling property is attained by decomposing the organics adhering on the photocatalyst sheet by the redox reaction of the photocatalyst when irradiated with the UV light lower than about 400 nm which is included in the sunshine or the fluorescent light. The thermal welding of the photocatalyst sheets can be readily conducted.

The photocatalyst sheets of the present invention, when used for film/fabric structure construction, make it readily possible to thermal welding mutually like the sheets of existing technology in which substrate is coated with the fluorocarbon resin. The fresh and beautiful color and looks of sheet can be long maintained after the completion of construction by the high antifouling property capability by the redox reaction of the photocatalyst such as titanium oxide exposed on the outermost surface of the sheet.

The water repellant photocatalyst sheet of the present invention is comprised as described above, and its function and effect are explained here.

The surface roughness of the fluorocarbon resin layer containing the photocatalyst coated on the uppermost layer of the substrate of the photocatalyst of the present invention is rougher than the surface roughness of flat and smooth substrate of aluminum or glass, and said uppermost layer surface is water-repellant as any fluorocarbon resin is, regardless of the photocatalytic function, and said water repellency is about 90° or more. Also, the photocatalyst sheets of the present invention can be easily thermally welded mutually by properly adjusting the photocatalyst content in the fluorocarbon resin layer of the uppermost layer.

When the UV light contained in the sunshine or a fluorescent light having the energy higher than the forbidden band gap of the photocatalyst, for example, lower than about 400 nm is irradiated onto such a photocatalyst sheet of the present invention, the antifouling property is caused by decomposing the organics or the like contaminating the photocatalyst sheet by the redox reaction of said photocatalyst. In this case, since the fluorocarbon resin layer of the uppermost layer has proper surface roughness, the surface area of the photocatalyst exposed on said uppermost layer can be made large, thereby still higher antifouling property can be attained. Consequently, if the fluorocarbon resin layer containing the photocatalyst is fouled with contamination, the high antifouling property can be obtained by the redox reaction of the photocatalyst around it located in the three dimensional orientation owing to the surface roughness.

Accordingly, when the photocatalyst sheet of the present invention is used for, for example, film/fabric structure architecture, mutual thermal welding of the photocatalyst sheets can be easily performed like the conventional sheets in which fluorocarbon resin is coated on substrate. Also, after the completion of film/fabric structure architecture, the beautiful color of sheets due to the high antifouling property is not deteriorated for long time using by the redox reaction of the photocatalyst such as titanium oxide exposed on the uppermost layer of the photocatalyst sheet.

Figure 5:
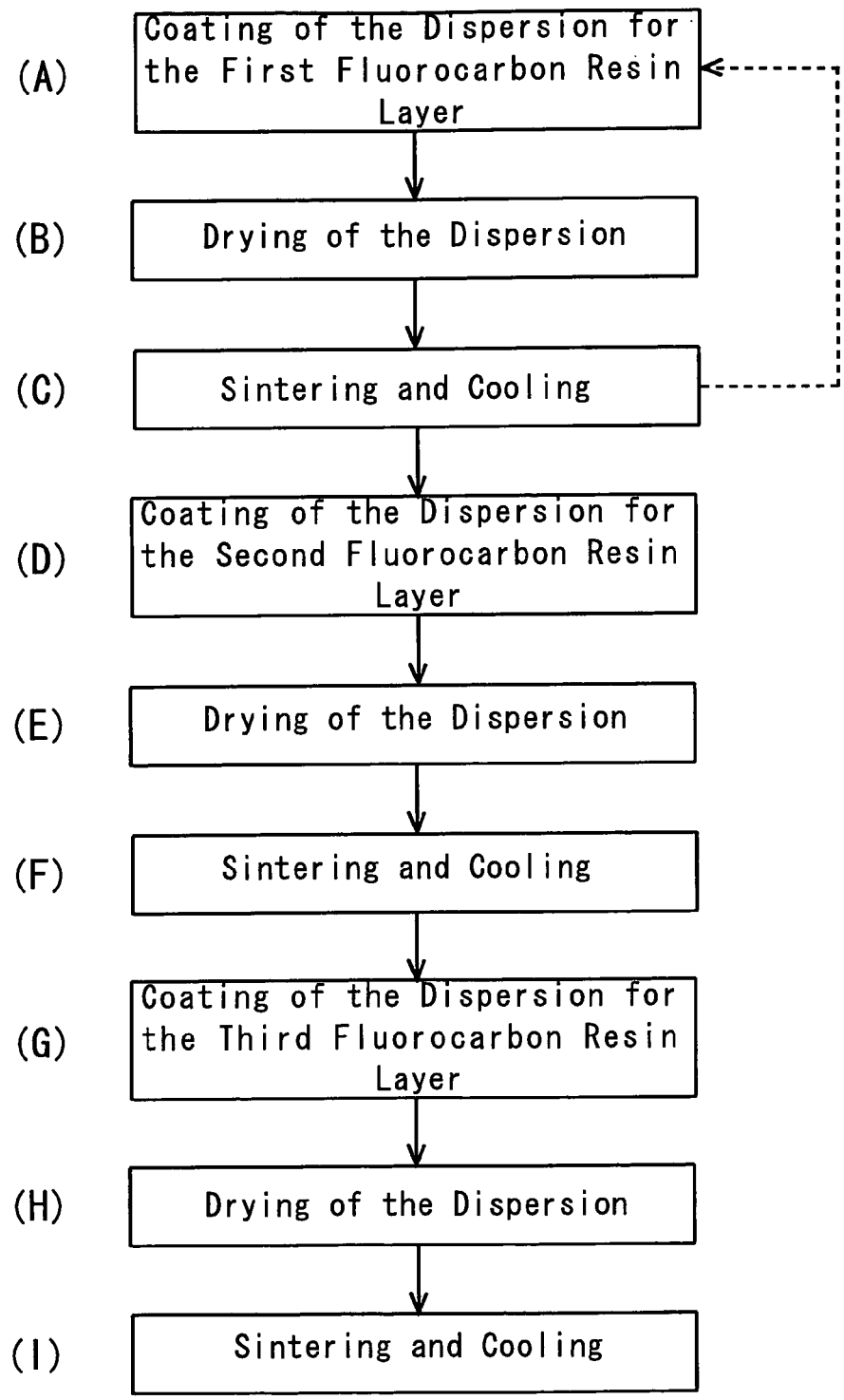
FIG. 5 is a flowchart of the processes to manufacture a photocatalyst sheet of the present invention.

A manufacturing method of a photocatalyst sheet of the present invention is illustrated in FIG. 5. FIG. 5 is a flowsheet of the processes to manufacture the photocatalyst sheet of this invention. First, as shown in FIG. 5(A), a fluorocarbon resin dispersion is coated on a substrate of glass fiber by dip-coating to form a first fluorocarbon resin layer 3. Here in this invention all the liquid, dispersion, and paint for coating to form fluorocarbon resin are called as dispersion in general.

Next, as shown in FIG. 5(B), a fluorocarbon resin dispersion coated on the substrate is dried in order to improve homogeneity of the coating of the dispersion. The drying temperature is 20-100° C. and drying time is 3-60 min in this drying process. This process may be either natural drying at room temperature or forced drying by blowing or heating depending upon the composition of fluorocarbon resin dispersion. The forced drying may be by any combination of electric furnace of nichrome wire, infrared or far infrared radiation, and a fan.

Next, as shown in FIG. 5(C), the first fluorocarbon resin layer 3 is formed as coating on the substrate 2 by sintering process. Here the temperature of this process may be determined depending on the melting point of the first fluorocarbon resin layer 3 coated on the substrate 2. The gap spaces between the fluorocarbon resin powder and the photocatalyst powder can be eliminated by setting the baking temperature higher than the melting point of the first fluorocarbon resin and thus by melting the resin. This sintering process may be conducted, for example, for about 3-30 min at temperature about 50° C. higher than the melting point of the first fluorocarbon resin. The sintering temperature should not exceed 50° C. higher than the melting point of the fluorocarbon resin, since by doing so the temperature would reach to the decomposition temperature of the resin and would cause the decomposition of the resin and the damage of the substrate.

After sintering, the product is cooled to room temperature by cooling process. At this point the substrate 2 is coated with the first fluorocarbon resin layer 3. Here a fast cooling is preferred in order to make the first fluorocarbon resin layer 3 uncrystallized, for the coating formed with the dispersion of the first fluorocarbon resin layer 3 would have no haze and would become the dense and tough film/fabric by this treatment. In this case, the cooling process may be the natural cooling after sintering in the circumstance of room temperature by taking the substrate 2 coated with the first fluorocarbon resin layer 3 out of the electric furnace.

The above described processes of coating, drying, and sintering may be repeated in order to have the designated film/fabric thickness of the first fluorocarbon resin layer 3. (See the dotted line in FIG. 5(A) and FIG. 5(C).)

Next, as shown in FIG. 5(D), a fluorocarbon resin dispersion for the second fluorocarbon resin layer 4 is coated by dip-coating process on the first fluorocarbon resin layer 3.

Next, as shown in FIG. 5(E), the fluorocarbon resin dispersion as the second fluorocarbon resin layer 4 coated on the first fluorocarbon resin layer 3 is dried in order to improve the homogeneity of the coating of fluorocarbon dispersion as the second fluorocarbon resin layer 4. The drying temperature may be about 20-100° C. and the drying time may be about 3-60 min in this drying process.

Next, as shown in FIG. 5(F), the coating of the second fluorocarbon resin layer 4 is formed on the first fluorocarbon resin layer 3 by sintering process. The temperature of this sintering process may be determined depending on the melting point of the second fluorocarbon resin layer 4 coated on the first fluorocarbon resin layer 3. After sintering, the product is cooled to room temperature by cooling process. At this point, the first fluorocarbon resin layer 3 is coated with the second fluorocarbon resin layer 4.

Next, as shown in FIG. 5(G), a fluorocarbon resin dispersion containing, for example, titanium oxide fine particles as the photocatalyst for a third fluorocarbon resin layer 5 is coated on the second fluorocarbon resin layer 4 by dipping coat process.

Next, as shown in FIG. 5(H), the dispersion as the fluorocarbon resin layer 5 containing the photocatalyst coated on the second fluorocarbon resin layer 4 is dried in order to improve the homogeneity of the coating. The drying temperature may be about 20-100° C. and the drying time may be about 3-60 min in this drying process.

Next, as shown in FIG. 5(I), the coating of the third fluorocarbon resin layer 5 containing the photocatalyst is formed on the second fluorocarbon resin layer 4 by sintering process. The temperature of this sintering process may be determined depending on the melting point of the third fluorocarbon resin layer 5 containing the photocatalyst. After sintering, the product is cooled to the room temperature by cooling process. At this point, the second fluorocarbon resin layer 4 is coated with the third fluorocarbon resin layer 5 containing the photocatalyst. Thus, the photocatalyst sheet of the present invention can be manufactured.

As the coating method for dispersion of the above described respective fluorocarbon resin layer, a bar-coating, an air spray-coating, a gravure-coating, a soaking, a sponge brushing, an electrostatic spray, a brushing, a flow-coating, or a roll-coating may be preferably applied in addition to the dip-coating.

The above described manufacturing process is the continuous process to form the first to the third fluorocarbon resin layers 3, 4, and 5 on substrate of the glass fiber 2 by the dip-coating, but such an alternative may also be applied for manufacture that the substrate of the glass fiber 2 on which the first and the second fluorocarbon resin layers 3,4 are coated is the first prepared, and then the third fluorocarbon resin layer 5 containing the photocatalyst is coated on it.

The photocatalyst sheet of the present invention can be manufactured as described above, and thus the photocatalyst sheet in which the third fluorocarbon resin layer containing the photocatalyst is coated on the outermost surface of substrate can be manufactured at low cost.

Next, an example of the photocatalyst sheet of the present invention is explained.

EXAMPLE 1

At first, on both sides of the glass fiber of average thickness of 0.4 mm as the substrate 2, PTFE was coated with about 0.2 mm thickness as the first fluorocarbon resin layer 3, and then FEP was coated on it with about 10 μm thickness as the second fluorocarbon resin layer 4. Finally, FEP containing the photocatalyst was coated with 3 μm thickness as the third fluorocarbon resin layer 5.

FIG. 6 is the table of the composition of a dispersion used to manufacture the third fluorocarbon resin layer 5 containing the photocatalyst of Example 1. The dispersion is prepared by mixing and stirring 21 kg of the aqueous dispersion of FEP (solid content 54% by weight, Dupont-Mitsui Fluorochemicals Company, Ltd., 120-J), 62.8 kg of the aqueous dispersion of the anatase type $TiO_2$ of particle diameter 1-100 nm (solid content 28% by weight, custom-made article), 94.4 kg of purified water, and 1.8 kg (corresponding to 1% by weight of whole product) of silicon surfactant (Nippon Unicar Company, Ltd., L-77). The weight ratio of FEP and titanium oxide powder was 40:60.

The third fluorocarbon resin layer 5 containing the photocatalyst was coated by the following process.

First, the above described dispersion of FEP to form the second fluorocarbon resin layer 4 coated on the above described substrate 2 was coated by dip-coating on both sides, dried by natural seasoning followed by 5 min drying at 60° C. It was further sintered for 10 min at 325° C. and cooled by natural cooling, and thus FEP as the second fluorocarbon resin layer 4 was formed.

The second fluorocarbon resin layer 4 described above was coated with said dispersion using dip-coating, and its coated layer was dried by natural seasoning followed by 5 min drying at 60° C. Further, it was sintered for 10 min at 380° C., cooled by natural cooling, FEP layer as the third fluorocarbon resin layer containing photocatalyst 5 of 3 μm thickness was formed on the second fluorocarbon resin layer 4, and thus the photocatalyst sheet 1 of the present invention was manufactured. Since the surface of the photocatalyst sheet 1 is not almost made smoother than the surface roughness of substrate of the glass fiber 2 by coating fluorocarbon resin layer, its surface roughnesses (Ra) in the directions of weft and warp are about 14 μm and 13 μm, respectively.

EXAMPLE 2

The FEP layer was formed as the third fluorocarbon resin layer 5 containing the photocatalyst on the outermost surface of substrate as in Example 1, except for the different composition of FEP dispersion.

FIG. 7 is the table of the composition of dispersion used to manufacture the third fluorocarbon resin layer 5 containing the photocatalyst of Example 2. The dispersion was prepared by mixing and stirring 42.3 kg of aqueous dispersion of FEP (solid content 54% by weight, Dupont-Mitsui Fluorochemicals Company, Ltd., 120-J), 54.4 kg of the aqueous dispersion of the anatase type $TiO_2$ of particle diameter 1-100 nm (solid content 28% by weight, custom-made article), 81.5 kg of purified water, and 1.8 kg (corresponding to 1% by weight of whole product) of silicon surfactant (Nippon Unicar Company, Ltd., L-77). The weight ratio of FEP and titanium oxide powder was 60:40. The photocatalyst sheet 1 of the present invention was manufactured by same process as described in Example 1. The surface roughness of the photocatalyst sheet 1 was about the same as in Example 1.

EXAMPLE 3

The FEP layer was formed as the third fluorocarbon resin layer 5 containing the photocatalyst on the outermost surface of substrate as in Example 1, except for the different composition of FEP dispersion.

FIG. 8 is the table of the composition of a dispersion used to manufacture the third fluorocarbon resin layer 5 containing the photocatalyst of Example 3. The dispersion was prepared by mixing and stirring 58.9 kg of aqueous dispersion of FEP (solid content 54% by weight, Du Pont-Mitsui Fluorochemicals Company Ltd., 120-J), 48.6 kg of the aqueous dispersion of the anatase type $TiO_2$ of particle diameter 1-100 nm (solid content 28% by weight, custom-made article), 70.7 kg of purified water, and 1.8 kg (corresponding to 1% by weight of whole product) of silicon surfactant (Nippon Unicar Company Ltd., L-77). The weight ratio of FEP and titanium oxide powder was 70:30. The photocatalyst sheet 1 of the present invention was manufactured by same process as in Example 1. The surface roughness of the photocatalyst sheet 1 was about the same as in Example 1.

EXAMPLE 4

The FEP layer was formed as the third fluorocarbon resin layer 5 containing the photocatalyst on the outermost surface of substrate as in Example 1, except for the different composition of FEP dispersion.

FIG. 9 is the table of the composition of a dispersion used to manufacture the third fluorocarbon resin layer 5 containing the photocatalyst of Example 4. The dispersion was prepared by mixing and stirring 80.9 kg of aqueous dispersion of FEP (solid content 54% by weight, Du Pont-Mitsui Fluorochemicals Company Ltd., 120-J), 39 kg of the aqueous dispersion of the anatase type $TiO_2$ of particle diameter 1-100 nm (solid content 28% by weight, custom-made article), 58.3 kg of purified water, and 1.8 kg (corresponding to 1% by weight of whole product) of silicon surfactant (Nippon Unicar Company Ltd., L-77). The weight ratio of FEP and titanium oxide powder was 80:20. The photocatalyst sheet 1 of the present invention was manufactured by same process as in Example 1. The surface roughness of the photocatalyst sheet 1 was about the same as in Example 1.

EXAMPLE 5

The FEP layer was formed as the third fluorocarbon resin layer 5 containing the photocatalyst on the outermost surface of substrate as in Example 1, except for the different composition of FEP dispersion.

FIG. 10 is the table of the composition of a dispersion used to manufacture the third fluorocarbon resin layer 5 containing the photocatalyst of Example 5. The dispersion was prepared by mixing and stirring 117.6 kg of aqueous dispersion of FEP (solid content 54% by weight, Du Pont-Mitsui Fluorochemicals Company Ltd., 120-J), 25.2 kg of the aqueous dispersion of the anatase type $TiO_2$ of particle diameter 1-100 nm (solid content 28% by weight, custom-made article), 35.4 kg of purified water, and 1.8 kg (corresponding to 1% by weight of whole product) of the silicon surfactant (Nippon Unicar Company Ltd., L-77). The weight ratio of FEP and titanium oxide powder was 90:10. The photocatalyst sheet 1 was manufactured by same process as in Example 1. The surface roughness of the photocatalyst sheet 1 was about the same as in Example 1.

EXAMPLE 6

Example 6, in which the photocatalyst sheet of the present invention 20 was manufactured, is explained next.

The photocatalyst sheet 20 was manufactured by coating PTFE of about 0.2 mm thickness as the first fluorocarbon resin layer 3 on both sides of glass fiber of the average thickness of 0.4 mm as the substrate 2, and then by using the same FEP dispersion as in Example 1, a laminating FEP layer of 10 μm thickness containing the photocatalyst as the second layer 4' on both sides of this PTFE layer, and by further laminating FEP layer of 3 μm thickness containing the photocatalyst as the third fluorocarbon resin layer 5. The dispersion to form FEP layer containing the photocatalyst is the same as that in Example 2, and the weight ratio of FEP and titanium oxide powder was 60:40. The surface roughness of the photocatalyst sheet 1 was about the same as in Example 1.

Comparative Examples are explained next.

Comparative Example 1

The FEP layer was formed as the third fluorocarbon resin layer 5 containing the photocatalyst on the outermost surface of substrate as in Example 1, except for the different composition of FEP dispersion.

FIG. 11 is the table of the composition of a dispersion used to manufacture the third fluorocarbon resin layer 5 containing the photocatalyst of Comparative Example 1. The dispersion was prepared by mixing and stirring 14.6 kg of aqueous dispersion of FEP (solid content 54% by weight, Du Pont-Mitsui Fluorochemicals Company Ltd., 120-J), 65.7 kg of the aqueous dispersion of the anatase type $TiO_2$ of particle diameter 1-100 nm (solid content 28% by weight, custom-made article), 97.9 kg of purified water, and 1.8 kg (corresponding to 1% by weight of whole product) of silicon surfactant (Nippon Unicar Company Ltd., L-77). The weight ratio of FEP and titanium oxide powder was 30:70. The photocatalyst sheet of Comparative Example 1 was manufactured by same process as in Example 1. The surface roughness of the photocatalyst sheet 1 was about the same as in Example 1.

Comparative Example 2 is explained next.

Comparative Example 2

The FEP layer was formed as the third fluorocarbon resin layer 5 containing the photocatalyst on the outermost surface of substrate as in Example 1, except for the different composition of FEP dispersion.

FIG. 12 is the table of the composition of dispersion used to manufacture the third fluorocarbon resin layer 5 containing the photocatalyst of Comparative Example 2. The dispersion was prepared by mixing and stirring 8.8 kg of aqueous dispersion of FEP (solid content 54% by weight, Du Pont-Mitsui Fluorochemicals Company Ltd., 120-J), 67.5 kg of the aqueous dispersion of the anatase type $TiO_2$ of particle diameter 1-100 nm (solid content 28% by weight, custom-made article), 101.9 kg of purified water, and 1.8 kg (corresponding to 1% by weight of whole product) of silicon surfactant (Nippon Unicar Company Ltd., L-77). The weight ratio of FEP and titanium oxide powder was 20:80. The photocatalyst sheet of Comparative Example 2 was manufactured by same process as in Example 1. The surface roughness of the photocatalyst sheet 1 was about the same as in Example 1.

Comparative Example 3 is explained next.

Comparative Example 3

In Comparative Example 3, the FEP layer was formed as the third fluorocarbon resin layer 5 containing the photocatalyst on the outermost surface of substrate as in Example 1, except for the different composition of FEP dispersion.

FIG. 13 is the table of the composition of dispersion used to manufacture the third fluorocarbon resin layer 5 containing the photocatalyst of Comparative Example 3. The dispersion was prepared by mixing and stirring 4.1 kg of the aqueous dispersion of FEP (solid content 54% by weight, Du Pont-Mitsui Fluorochemicals Company Ltd., 120-J), 70.2 kg of the aqueous dispersion of the anatase type $TiO_2$ of particle diameter 1-100 nm (solid content 28% by weight, custom-made article), 103.9 kg of purified water, and 1.8 kg (corresponding to 1% by weight of whole product) of silicon surfactant (Nippon Unicar Company Ltd., L-77). The weight ratio of FEP and titanium oxide powder was 10:90. The photocatalyst sheet of Comparative Example 3 was manufactured by same process as in Example 1. The surface roughness of the photocatalyst sheet 1 was about the same as in Example 1.

Comparative Example 4

In Comparative Example 4, the sheet of the conventional structure was manufactured by the same process as in Example 1, except for excluding the photocatalyst in the third fluorocarbon resin layer as the outermost surface. The surface roughness of the photocatalyst sheet 1 was somewhat larger than in Example 1.

The photocatalyst sheets prepared in Examples 1-6 and the sheets prepared in Comparative Examples 1-4 were actually used in film/fabric structure constructions, and were evaluated on the thermal weldability and the antifouling property by outdoor exposure.

FIG. 14 is the table of the evaluation results of thermal weldability and the antifouling property by outdoor exposure of Examples and Comparative Examples. Table shows the % by weight of the photocatalyst in the third fluorocarbon resin layer, and the evaluation results of the corresponding thermal weldability, and the antifouling property by outdoor exposure in Examples and Comparative Examples. Thermal weldability was evaluated either by a test person's handwork or using a test machine on the thermally adhered part of the photocatalyst sheets, and the test was carried out in such a way that the tested part was peeled off at the rate of 20 mm/min. If the fluorocarbon resin layers were completely sintered and the whole resin part was peeled off from the glass fiber substrate, the evaluation is good and indicated by ○, and if the peeling occurred at the boundary of resins, then the result was evaluated as poor and indicated by X.

As is clear from the figure, the thermal weldability was good for Examples 1-6 where % by weight of the photocatalyst in the third fluorocarbon resin layer (shortly termed as % by weight of the photocatalyst) was in the range of 10-60%, and also for Comparative Example 4 where no photocatalyst was contained.

On the other hand, the thermal weldability was poor for Comparative Examples 1-3 where % by weight of the photocatalyst was 70-90%. The reason for poor result for the % by weight of the photocatalyst over 70% is supposedly the welding force between the third fluorocarbon resin layer 5 and the first and the second fluorocarbon resin 4, 4' underneath was lowered, due to the increase of the photocatalyst in the third fluorocarbon resin layer 5.

The evaluation of antifouling property by outdoor exposure was carried out by observing the dirtiness of the sheet surface after twelve months outdoor exposure of the sheets of Examples and Comparative Examples. The sheets without dirt were evaluated as excellent and marked with ○, the sheets with little dirt were evaluated as good and marked with Δ, and the sheets with dirt were evaluated as poor and marked with X. Outdoor exposure was carried out on the rooftop of the Research Institute of Space Technology (Hirakata city, Osaka) of the present patent applicant.

As is evident from the figure, the antifouling property was excellent for Examples 1-4 and 6 where % by weight of the photocatalyst in the outermost fluorocarbon resin layer 5 was in the range from 20 to 60%, and was good with little dirt for Example 5 and where % by weight of the photocatalyst was 10% and for Comparative Examples 1-3 where it was over 70%. On the other hand, the sheet of existing technology of Comparative Example 4, which was not contained the photocatalyst in the outermost layer, showed no antifouling ability.

A little poor antifouling property in Example 5 was caused by the low content of the photocatalyst (10% by weight) in the fluorocarbon resin layer, it was still far better than Comparative Example 4 where no photocatalyst was contained, and proved the effect of the photocatalyst addition.

On the other hand, the reason antifouling property was lowered in case of the higher content of the photocatalyst in Comparative Examples 1-3 may supposedly be the thermal welding between the fluorocarbon resin layer 5 containing the photocatalyst of the outermost layer and the fluorocarbon resin layers 3 and 4 underneath was poor, and the fluorocarbon resin layer containing the photocatalyst 5 was gradually peeled off as time elapsed, and, as a consequence, the lower fluorocarbon resin layers not containing the photocatalyst 3 and 4 became exposed directly to the atmosphere.

In this case, as for the antifouling property of the thermally welding part of Examples 1-6 with the excellent antifouling property, the photocatalyst sheet 20 of Example 6 proved least fouled with dirt. The reason for it was supposedly that the fault or damage in the fluorocarbon resin layer containing the photocatalyst 5 did not readily occur as time elapsed, since the fluorocarbon resin layer containing the photocatalyst was thick because the outermost third fluorocarbon resin layer 5 and the second fluorocarbon resin layer 4' both contained photocatalyst.

By these facts it should be obvious that the excellent thermal weldability and excellent antifouling property were achieved in the range from 10 to 60% by weight of titanium oxide in the fluorocarbon resin of the third layer.

The photocatalyst sheets prepared in Examples 1-6 and the sheets prepared in Comparative Examples 1-4 were actually used in film/fabric structure constructions, and evaluated on the photocatalytic function of the uppermost layer containing the photocatalyst, the water repellency, the thermal weldability and the antifouling property by outdoor exposure.

FIGS. 15 and 16 are the tables showing the evaluation results of the photocatalytic function of the uppermost layer containing the photocatalyst, contact angles, the thermal weldability and the antifouling property by outdoor exposure of Examples and Comparative Examples. The tables show the % by weight of the photocatalyst in the third fluorocarbon resin layer in each Example and Comparative Example, and the corresponding photocatalytic function of the uppermost layer, water repellency, the thermal weldability and the fouling property by outdoor exposure.

As photocatalytic function of the uppermost layer, the decomposition characteristics of an organic (oleic glyceride)

were measured. Oleic glyceride was coated on the surface (25 cm²) of fluorocarbon resin layer containing the photocatalyst, and its decomposed amount upon the UV light irradiation was measured. UV light irradiation source was such that a 15 W black light lamp (FL15BLB, by Toshiba Lighting & Technology Corporation), and the UV light was irradiated for 24 hours. The UV light intensity in this case was 1 mW/cm² that is equivalent to the UV light intensity of outdoor in daytime.

As is obvious from FIG. 15, in Examples 1-6 where the photocatalyst contained in the fluorocarbon resin layer of the uppermost layer 5 was 10-60% by weight, the rate of decomposition of oleic glyceride was found to be as high as 0.4 mg/cm² day or more.

And as is also obvious from FIG. 16, in Comparative Examples 1-3 where the photocatalyst was 70% by weight or more, the rate of decomposition of oleic glyceride was as high as 0.4 mg/cm² day or more. In case of the conventional sheet that does not contain the photocatalyst in Comparative Example 4, the measurement was not conducted for there is no decomposing action of oleic glyceride.

As for the reducing action as photocatalytic function of the uppermost layer, the photocatalyst sheet was soaked into the 1N (normal) silver nitrate aqueous solution, and the color difference change (ΔE*) was measured after UV light was irradiated for one minute by 1 mW/cm² from the UV light source mentioned above onto the surface of fluorocarbon resin layer containing said photocatalyst. The method of the measurement of the color difference change was JIS Z8701 and Z8730. Measurement was performed in the visible light region (380-780 nm) by using a spectrophotometer (Hitachi U-3410).

As is obvious from FIG. 15, in Examples 1-6 where the photocatalyst contained in the fluorocarbon resin layer of the uppermost layer 5 was 10-60% by weight, the color difference change (ΔE*) by the reducing action of the photocatalyst of silver ion in the silver nitrate aqueous solution was 4.94 to 28, and the reducing action of the photocatalyst turned out to be high. The color difference change is larger with the higher photocatalyst content, since the reducing function increases.

As is also obvious from FIG. 16, in Comparative Examples 1-3 where the photocatalyst was 70% by weight or more, the color difference change (ΔE*) by reducing action of the photocatalyst of silver ion in the silver nitrate aqueous solution was 26 to 28 and the reducing action of the photocatalyst turned out to be high. In case of the conventional sheet that does not contain photocatalyst in Comparative Example 4, the measurement was not conducted since there is no reducing action.

Further, the contact angle of the uppermost layer was measured right after the manufacture of the photocatalyst sheets of Examples and Comparative Examples, and, after the UV light irradiation. The UV light was irradiated by using a Xenon Weather Meter (18 mW/cm²) for 24 hours. The measurement of the contact angle was by using a contact angle meter (Kyowa Interface Science Corporation, Ltd., model CA-X), and titrating 6 μL (liter, 6×10⁻⁶ L) of pure water onto the sample surface.

As is evident from FIG. 15, in Examples 1-6 where the photocatalyst contained in the fluorocarbon resin layer of the uppermost layer 5 was 10-60% by weight, the contact angle right after the manufacture was about 110°-120° and it turned out to be water-repellant. Also in each of Examples 1-6, the contact angle after UV light irradiation was about 104°-111°, and, though a little bit lowered than right after the manufacture, it still showed water-repellency.

As is obvious from FIG. 16, in Comparative Example 1 where the photocatalyst was 70% by weight, and in Comparative Example 2 where the photocatalyst was 80% by weight, the contact angle right after the manufacture and after the UV light irradiation was 105° or higher, and it turned out to be water-repellant. And in Comparative Example 3 where the photocatalyst was 90% by weight the contact angle right after the manufacture was about 108°, and it was water-repellant. And after the UV light irradiation the contact angle was 80°, and it became hydrophobic. In case of the conventional sheet that does not contain the photocatalyst in Comparative Example 4, the measurement was not conducted since it is the contact angle of fluorocarbon resin.

Next, as for the thermal weldability of the photocatalyst sheet, it was evaluated either by a test person's handwork or using a test machine on the thermally welded part of the photocatalyst sheets, and the test was carried out in such a way that the tested part was peeled off at the rate of 20 mm/min. If the fluorocarbon resin layers were mutually completely sintered, and the whole fluorocarbon resin layer was completely peeled off from glass fiber substrate, the evaluation is good and indicated by ○. And if the peeling occurred at the boundary of fluorocarbon resin layers or in other like cases, then the result was evaluated as poor and indicated by X.

As is obvious from FIGS. 15 and 16, in Examples 1-6 where the % by weight of the photocatalyst contained in the third fluorocarbon resin layer (hereinafter, to be called properly as the % by weight of the photocatalyst) was 10-60% by weight, and in Comparative Example 4 where photocatalyst is not contained, thermal weldability was good. On the other hand, in Comparative Examples 1-3 where the photocatalyst was 70-90% by weight, its thermal weldability was no good.

The reason why the photocatalyst becomes thus no good above 70% by weight is presumed that, since the photocatalyst contained in the third fluorocarbon resin layer 5 increases, the coherence force between the third fluorocarbon resin layer 5 and the first fluorocarbon resin layer 3 and the second fluorocarbon resin layers 4, 4' underneath lowers.

Next, the evaluation of antifouling property by the outdoor exposure was conducted by evaluating the antifouling property of the sheet surface after the sheets of said Examples and Comparative Examples were exposed outdoor for 12 months. The sheet with antifouling property was estimated as excellent and indicated by ○, that with almost antifouling property was good, indicated by Δ, and that with antifouling property was estimated as no good and indicated by X. Outdoor exposure test was carried out on the rooftop of the Research Institute of Space Technology (Hirakata city, Osaka) of the present patent applicant.

As is clear from FIG. 15, in Examples 1-4 and 6 where the photocatalyst contained in the uppermost layer of the fluorocarbon resin layer 5 was 20-60% by weight antifouling property was excellent. Further, as is clear from FIGS. 15 and 16, in Example 5 where the photocatalyst was 10% by weight, and in Comparative Examples 1-3 where the photocatalyst was 70% by weight or more, the antifouling property is likely to occur. On the other hand, the conventional sheet of Comparative Example 4 that does not contain the photocatalyst in the uppermost layer turned out to show no antifouling property.

The antifouling property of Example 5 was a little poor because the photocatalyst in the fluorocarbon resin layer was little (10% by weight), but still much higher than in Comparative Example 4 where no photocatalyst was contained, and hence no antifouling property observed. Thus, the effect of formulated the photocatalyst is remarkable.

On the other hand, the reason why the antifouling property was poor in Comparative Examples 1-3 where much photocatalyst was contained is presumed, that, since the thermal weldability is poor between the uppermost fluorocarbon resin layer 5 containing the photocatalyst and the fluorocarbon resin layers beneath it 3 and 4, the falloff of the fluorocarbon resin layer containing the photocatalyst 5 occurs as time elapses, and the lower fluorocarbon resin layers 3 and 4 not containing the photocatalyst contact directly with the atmosphere. However, as for antifouling property of the thermally welded parts of Examples 1-6, the photocatalyst sheet 20 of Example 6 turned out to be least to be fouled. This is presumed because, since both the third fluorocarbon resin layer 5 and the second fluorocarbon resin layer 4' of the uppermost layer contain the photocatalyst, thereby the fluorocarbon resin layer containing it is thick, So such faults as damage in the fluorocarbon resin layer containing the photocatalyst 5 does not readily occur as time elapses.

Thus, it is concluded that, within the range of 10-60% by weight of titanium oxide with respect to the fluorocarbon resin in the third fluorocarbon resin layer containing photocatalyst, the good thermal weldability as well as high antifouling property can be attained.

By overall evaluation of the measurement results of each item of Examples and Comparative Examples mentioned above, the high antifouling property and the thermal weldability were attained in Examples 1-6 (The overall evaluation in FIG. 15 is ○). In Comparative Examples 1-4, the high antifouling property and the thermal weldability were not attained simultaneously (The overall evaluation in FIG. 16 is X).

The present invention is not limited by the above described Examples, and it is needless to state that technological variations are possible within the range of the invention described in the claim, and these variations are also included in the claim. For example, various substrates and fluorocarbon resins which were explained in the above mentioned embodiments may be properly chosen depending on the purpose of use, and needless to state that the composition of fluorocarbon resin dispersion containing the photocatalyst may also be properly chosen.

INDUSTRIAL APPLICABILITY

According to the photocatalyst sheet of the present invention, water-repellency and the high antifouling property is attained without inhibiting the thermal weldability which is characteristics for the sheet the outermost layer of which is fluorocarbon resin layer of the conventional technology. Thus, when the photocatalyst sheet of this invention is used in place of the existing sheets for architectural film/fabric structures and the like, the products can endure long without discoloration or fading of the color of the sheet, since the mutual thermal welding of sheets and the antifouling property are possible.

Also, according to the method of manufacture of the photocatalyst sheet of the present invention, the photocatalyst sheet, for which mutual thermal welding of the photocatalyst sheets is easily effected, and which has the water-repellency and the high antifouling property can be manufactured at low cost.

What is claimed is:

1. A photocatalyst sheet comprising:
a substrate made of glass fiber;
a first fluorocarbon resin layer made of polytetrafluoroethylene (PTFE) coated on said substrate;
a second fluorocarbon resin layer made of copolymer of tetrafluoroethylene-hexafluoropropylene (FEP), or copolymer of tetrafluoroethylene-perfluoroalkylvinylether (PFA) coated on said first fluorocarbon resin layer; and
a third fluorocarbon resin layer consisting of copolymer of tetrafluoroethylene-hexafluoropropylene (FEP) containing photocatalysts at least of titanium oxide ($TiO_2$ or $TiO_3$), coated on said second fluorocarbon resin layer;
of which said photocatalysts have the part exposed on said third fluorocarbon resin layer;
the ratio of said photocatalysts in said third fluorocarbon resin layer is 10-60 weight %; and
the surface of the fluorocarbon resin layer containing said photocatalysts of said photocatalyst sheet is water repellent upon ultraviolet light irradiation, and
when said photocatalyst sheets are thermally welded to each other, and if a welded part is peeled off at the rate of 20 mm/min, then the first fluorocarbon resin layer, the second fluorocarbon resin layer and the third fluorocarbon resin layer as a whole layer is completely peeled off from said substrate.

2. A photocatalyst sheet as set forth in claim 1, wherein the surface state of said substrate made of glass fiber is either smooth, rough, or mesh-like.

3. A photocatalyst sheet as set forth in claim 1, wherein photocatalysts are contained in said second fluorocarbon resin layer.

4. A photocatalyst sheet as set forth in claim 1, wherein the photoxidation ability of the surface of said fluorocarbon resin layer containing photocatalysts of said photocatalyst sheet is such that, when oleic glyceride is coated on said surface of fluorocarbon resin layer, and an ultraviolet light is irradiated onto said surface by 1 $mW/cm^2$, the rate of decomposition of said oleic glyceride is 0.1 $mg/cm^2$ day or more.

5. A photocatalyst sheet as set forth in claim 1, wherein the photoreduction ability of the surface of said fluorocarbon resin layer containing photocatalysts of said photocatalyst sheet is such that, when said photocatalyst sheet is soaked in the 0.1N (normal) silver nitrate aqueous solution, and ultraviolet light is irradiated for one minute onto the surface of said fluorocarbon resin layer containing photocatalysts by 1 $mW/cm^2$, the color difference change is $\Delta E^* > 1$.

6. A photocatalyst sheet as set forth in claim 1, wherein the contact angle of the surface of said fluorocarbon resin layer containing photocatalysts is about 90 degrees or more.

7. A photocatalyst sheet as set forth in claim 1, wherein the thickness of said fluorocarbon resin layer containing photocatalysts is 1 µm or more. *

8. A photocatalyst sheet comprising: a substrate;
a first fluorocarbon resin layer made of polytetrafluoroethylene (PTFE) coated on said substrate;
a second fluorocarbon resin layer made of copolymer of tetrafluoroethylene-hexafluoropropylene (FEP) or copolymer of tetrafluoroethylene-perfluoroalkylvinylether (PFA) coated on said first fluorocarbon resin layer; and
a third fluorocarbon resin layer consisting of copolymer of tetrafluoroethylene-hexafluoropropylene (FEP) containing photocatalysts at least of titanium oxide (TiO2 or TiO3) coated on said second fluorocarbon resin layer;
said photocatalysts have the part exposed on said third fluorocarbon resin layer;
the ratio of said photocatalysts in said third fluorocarbon resin layer is 10-60 weight %; and
said photocatalyst sheet can be thermally welded to said third fluorocarbon resin layer, and when said photocatalyst sheets are thermally welded to each other, and if a welded part is peeled off at the rate of 20 mm/min, then whole of said fluorocarbon resin layer the first fluorocarbon resin layer, the second fluorocarbon resin layer and the third fluorocarbon resin layer as a whole layer is completely peeled off from said substrate.

9. A photocatalyst sheet comprising:
a substrate;
a first fluorocarbon resin layer made of polytetrafluoroethylene (PTFE) coated on said substrate;
a second fluorocarbon resin layer made of copolymer of tetrafluoroethylene-hexafluoropropylene (FEP) or copolymer of tetrafluoroethylene-perfluoroalkylvinylether (PFA) containing photocatalysts at least of titanium oxide ($TiO_2$ or $TiO_3$) coated on said first fluorocarbon resin layer; and
a third fluorocarbon resin layer consisting of copolymer of tetrafluoroethylene-hexafluoropropylene (FEP) containing photocatalysts at least of titanium oxide ($TiO_2$ or $TiO_3$) coated on said second fluorocarbon resin layer;
said photocatalysts have the part exposed on said third fluorocarbon resin layer;
the ratio of said photocatalysts in said third fluorocarbon resin layer is 10-60 weight %;
the surface of the fluorocarbon resin layer containing said photocatalysts of said photocatalyst sheet is water repellent upon ultraviolet light irradiation, and
said photocatalyst sheet can be thermally welded to said third fluorocarbon resin layer, and when said photocatalyst sheets are thermally welded to each other, and if a welded part is peeled off at the rate of 20 mm/min, then the first fluorocarbon resin layer, the second fluorocarbon resin layer and the third fluorocarbon resin layer as a whole layer is completely peeled off from said substrate.

10. A photocatalyst sheet as set forth in claim 8, wherein photocatalysts are contained in said second fluorocarbon resin layer.

11. A photocatalyst sheet as set forth in claim 8 or 9, wherein the photoxidation ability of the surface of said fluorocarbon resin layer containing the photocatalyst is such that, when oleic glyceride is coated on said surface of fluorocarbon resin layer, and an ultraviolet light is irradiated onto said surface by 1 mW/cm$^2$, the rate of decomposition of said oleic glyceride is 0.1 mg/cm$^2$ day or more.

12. A photocatalyst sheet as set forth in claim 8 or 9, wherein the photoreduction ability of the surface of said fluorocarbon resin layer containing the photocatalyst is such that, when said photocatalyst sheet is soaked in the 0.1N (normal) silver nitrate aqueous solution, and an ultraviolet light is irradiated for one minute onto the surface of said fluorocarbon resin layer containing the photocatalyst by 1 mW/cm$^2$, the color difference change is $\Delta E^* \geq 1$.

13. A photocatalyst sheet as set forth in claim 8 or 9, wherein the contact angle of the surface of said fluorocarbon resin layer containing the photocatalyst is about 90 degrees or more.

14. A photocatalyst sheet as set forth in claim 8 or 9, wherein the thickness of said fluorocarbon resin layer containing the photocatalyst is 1 μm or more.

15. A photocatalyst sheet as set forth in claim 1, characterized in that said photocatalysts are TiO2.

16. A photocatalyst sheet as set forth in claim 8, characterized in that said photocatalysts are TiO2.

17. A photocatalyst sheet as set forth in claim 9, characterized in that said photocatalysts are TiO2.

* * * * *